(12) United States Patent
Tan et al.

(10) Patent No.: US 8,173,763 B1
(45) Date of Patent: May 8, 2012

(54) CARBON NANOFIBERS AND NANOTUBES GRAFTED WITH A HYPERBRANCHED POLY (ETHER-KETONE) AND ITS DERIVATIVES

(75) Inventors: Loon-Seng Tan, Centerville, OH (US); David H. Wang, Beavercreek, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 1060 days.

(21) Appl. No.: 12/079,083

(22) Filed: Mar. 3, 2008

Related U.S. Application Data

(60) Provisional application No. 60/919,192, filed on Mar. 8, 2007.

(51) Int. Cl.
*C08G 2/18* (2006.01)
*C08G 12/06* (2006.01)
*C08G 12/28* (2006.01)
*C08G 16/06* (2006.01)

(52) U.S. Cl. ........ 528/223; 528/220; 528/222; 528/224; 528/229; 528/373; 528/425; 525/63

(58) Field of Classification Search .................. 528/220, 528/222, 223, 224, 229, 373, 425; 525/63
See application file for complete search history.

(56) References Cited

OTHER PUBLICATIONS

Wang, David H.; Mirau, Peter; Li, Bing; Li, Christopher Y.; Baek, Jong-Beom; Tan, Loon-Seng. "Solubilization of Carbon Nanofibers with a Covalently Attached Hyperbranched Poly(ether ketone)" Chemistry of Materials (2008), 20(4), 1502-1515.
Choi, Ja-Young; Wang, David H.; Tan, Loon-Seng; Baek, Jong-Beom. "In-situ polymerization of $AB_2$ monomer in the presence of carbon nanotubes in polyphosphoric acid", Polymer Preprints (American Chemical Society, Division of Polymer Chemistry) (2007), 48(1), 437-438.
Wang, David H.; Arlen, Michael J.; Baek, Jong-Beom; Vaia, Richard A.; Tan, Loon-Seng. "Nanocomposites Derived from a Low-Color Aromatic Polyimide (CP2) and Amine-Functionalized Vapor-Grown Carbon Nanofibers: In Situ Polymerization and Characterization" Macromolecules (2007), 40(17), 6100-6111, Washington, DC, United States.
Baek, Jong-Beom; Lyons, Christopher B.; Tan, Loon-Seng. "Covalent modification of vapour-grown carbon nanofibers via direct Friedel-Crafts acylation in polyphosphoric acid", Journal of Materials Chemistry (2004), 14(13), 2052-2056.
Wang, David H.; Baek, Jong-Beom; Tan, Loon-Seng. "Grafting of a hyperbranched poly(ether-ketone) PEK onto multi-walled carbon nanotubes MWNT with an $AB_2$ monomer", Polymer Preprints (American Chemical Society, Division of Polymer Chemistry) (2006), 47(2), 387-388.
Choi, Ja-Young; Oh, Se-Jin; Lee, Hwa-Jeong; Wang, David H.; Tan, Loon-Seng; Baek, Jong-Beom. "In-situ grafting of hyperbranched poly(ether ketone)s onto multiwalled carbon nanotubes via the $A_3 + B_2$ approach", Macromolecules (2007), 40(13), 4474-4480, Washington, DC, United States.
Choi, Ja-Young; Han, Sang-Wook; Huh, Wan-Soo; Tan, Loon-Seng; Baek, Jong-Beom. "In situ grafting of carboxylic acid-terminated hyperbranched poly(ether-ketone) to the surface of carbon nanotubes", Polymer (2007), 48(14), 4034-4040.

*Primary Examiner* — Duc Truong
(74) *Attorney, Agent, or Firm* — AFMCLO/JAZ; Bart Hersko

(57) ABSTRACT

Provided are hyperbranched poly(ether-ketone)-based nanocomposites with the following generic formula:

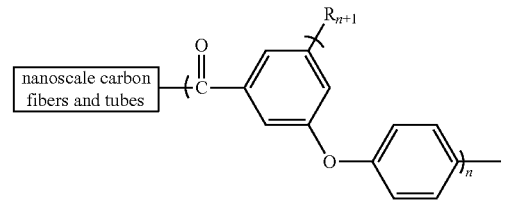

wherein n is the degree of polymerization and R is carboxylic acid (COOH) and various functional groups that could be derived from COOH, such as benzothiazole, benzoxazole, benzimidazole, esters, and amines. Also provided are a process for preparing the above composite and a chain-end conversion methodology to tailor thermal and solubility properties.

12 Claims, No Drawings

CARBON NANOFIBERS AND NANOTUBES GRAFTED WITH A HYPERBRANCHED POLY (ETHER-KETONE) AND ITS DERIVATIVES

CROSS REFERENCE TO RELATED APPLICATION

This application claims priority of the filing date of Provisional Application Ser. No. 60/919,192, filed on Mar. 8, 2007.

RIGHTS OF THE GOVERNMENT

The invention described herein may be manufactured and used by or for the Government of the United States for all governmental purposes without the payment of any royalty.

BACKGROUND OF THE INVENTION

The present invention relates to new nanocomposites based on nanoscale carbon fibers and tubes modified with hyperbranched ether-ketone polymers on the surfaces and their methods of preparation.

One-dimensional, carbon-based, nano-structured materials are generally divided into three categories based on their diameter dimensions: (i) single-wall carbon nanotubes or SWNT (0.7-3 nm); (ii) multi-wall carbon nanotubes or MWNT (2-20 nm); (iii) carbon nanofibers or CNF (40-100 nm). While the length of vapor grown carbon nanofiber (VGCNF) ranges 30-100 µm, it is difficult to determine the lengths of SWNT and MWNT because of their strong proclivity to aggregate (to form "ropes") but they are generally considered to be two-orders of magnitude shorter than CNF.

Because of the numerous technological opportunities that their extraordinary thermal, electrical, mechanical, and optical properties could lead to, they have been receiving widespread attention in the advanced materials research community in recent years. To take advantage of their predicted properties, these nanomaterials are being actively investigated with respect to their structural reinforcement, energy/electron transport or storage capabilities, and interactions with electromagnetic waves, as well as the efficient ways to transfer their outstanding properties to the polymeric matrices. A common goal is to make the resulting polymer nanocomposites for advanced applications that are affordable, lightweight and multi-functional. Several studies have been performed on CNT or VGCNF and reported their reinforcement in various thermoplastics and thermoset matrices. As an approach to achieving a good dispersion of single-wall carbon nanotube (SWNT) in a high performance polymer, in-situ polymerization of polybenzoxazole (PBO) with SWNT in polyphosphoric acid (PPA) at 190° C. has been reported recently. Additionally, great strides have been achieved in the functionalization of SWNT to impart solubility and provide more processing options. Various in-situ polymerization methods in grafting hyperbranched polymers to or from the surfaces of carbon nanofibers and carbon nanotubes have been reported in the literature: (a) atom-transfer radical polymerization (ATRP); (b) ring-opening polymerization; (c) self-condensing vinyl polymerization (SCVP); (d) polycondensation. In a most recent example, SWNT was grafted with poly(aminoamine)-type dendrimers using a divergent methodology. In all cases, (a) the CNF/CNT surfaces were prefunctionalized with appropriate functional groups (e.g. initiators) for the subsequent polymerization processes; (b) either aliphatic or partially aliphatic hyperbranched polymers were resulted. In this invention, no such prefunctionalization was required, and the resulting hyperbranched poly(ether-ketone) is wholly aromatic, which will allow higher use temperatures.

Accordingly, it is an object of the present invention to provide a process to attach a carboxylic acid-terminated hyperbranched poly(ether-ketone) onto the surfaces of nanoscale carbon fibers and tubes.

It is another object of this invention to provide functionalized nanoscale carbon fibers and tubes via end-group functionality conversion of the carboxylic acid-terminated hyperbranched polymer.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there are provided functionalized nanoscale carbon fibers and tubes of the formula:

In accordance with the present invention there are provided hyperbranched poly(ether-ketone)-based nanocomposites with the following generic formula:

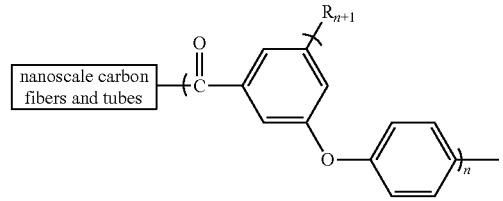

wherein n is the degree of polymerization and R is carboxylic acid (COOH) and various functional groups that could be derived from COOH, such as benzothiazole, benzoxazole, benzimidazole, esters, and amine. Also provided are the processes for preparing the above nanocomposites.

DETAILED DESCRIPTION OF THE INVENTION

The as-received CNF contains a significant amount of hydrogen, about 1 wt % as judged by elemental analysis result and IR spectral data. Lesser hydrogen contents were found for multi-walled carbon nanotubes (MWNT) from various commercial sources. This hydrogen content is presumably attributable to the $sp^3C$—H and $sp^2C$—H defects, and may be related to the use of methane as the major component in the feedstock for the VGCNF production. It was demonstrated that CNF and MWNT could be functionalized via Friedel-Crafts acylation with a model compound, 2,4,6-trimethylphenoxybenzoic acid in polyphosphoric acid (PPA)/$P_2O_5$ medium prepared as described in the paragraphs below. The degree of functionalization, reported as the number of defect C—H sites that were arylcarbonylated per 100 carbon, was determined to be ~3 atom % by the combination of TGA and elemental analysis.

The nanocomposite of this invention is prepared by reacting an aromatic diacid (an $A_2B$ monomer) of the formula

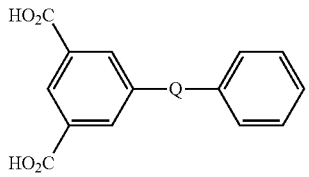

wherein Q is —O— or —O—$(CH_2)_n$—O—, wherein n has a value of 2-12, with a nanoscale carbon fiber or tube in polyphosphoric acid (PPA), as described below.

Suitable aromatic diacids useful in this reaction include 5-phenoxyisophthalic acid, 5-phenyloxyethoxy-isophthalic acid, and the like.

Attachment of the hyperbranched poly(ether-ketone) onto the surfaces of nanoscale carbon fibers and tubes is conducted in polyphosphoric acid (PPA). Preliminarily, it is helpful to describe the chemistry of phosphoric acids and strong phosphoric acids or polyphosphoric acids as follows: As used herein the term "phosphoric acid(s)" means commercial phosphoric acid(s) containing 85-86% $H_3PO_4$. The strong phosphoric acids, or polyphosphoric acids referred to as PPA (polyphosphoric acid) are members of a continuous series of amorphous condensed phosphoric acid mixtures given by the formula

or

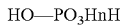

where the value of n depends on the molar ratio of water to phosphorus pentoxide present.

In its most general definition, polyphosphoric acid composition can range from distributions where the average value of n is less than unity, giving rise to a mobile liquid, to high values of n, where the polyphosphoric acid is a glass at normal temperatures. Because the species of polyphosphoric acid are in a mobile equilibrium, a given equilibrium composition can be prepared in many ways. For instance, the same distribution or polyphosphoric acid composition could be prepared by either starting with concentrated orthophosphoric acid ($H_3PO_4$, n=1) and driving off water or by starting with phosphorus pentoxide ($P_2O_5$) and adding an appropriate amount of water.

All polyphosphoric acid compositions can be described as a ratio of $P_2O_5$ and water by reducing the various species present (on paper) to $P_2O_5$ and water. We will then use the convention that polyphosphoric acid composition will be expressed in terms of a $P_2O_5$ content (as a percentage) defined as $P_2O_5$ content =(weight of $P_2O_5$)/(weight of $P_2O_5$+weight of water)×100.    i.

Thus, the $P_2O_5$ content of pure orthophosphoric acid could be derived by reducing one mole of $H_3PO_4$ to 0.5 moles $P_2O_5$+1.5 moles $H_2O$. Converting to weights gives the $P_2O_5$ content as (0.5*142)/((0.5*142)+(1.5*18.01))=72.4%

Similarly, the $P_2O_5$ content of commercial polyphosphoric acid can be derived in the following way. Polyphosphoric acid is available commercially in two grades, 105% and 115%. These percentages refer to $H_3PO_4$ content, which means that 100 g of the two grades contain 105 and 115 grams of $H_3PO_4$. The $P_2O_5$ content of 115% polyphosphoric acid can then be calculated knowing the $P_2O_5$ content of 100% $H_3PO_4$:

(115*0.724)/100=83.3%

The polymerization is conducted in polyphosphoric acid (PPA) at a polymer concentration of about 5 weight percent at a temperature of about 130° C. The diacid ($A_2B$ monomer), nanoscale carbon fibers or tubes, and PPA (83% $P_2O_5$ assay) are combined and stirred with dried nitrogen purging at about 130° C. for about 3 h. Additional $P_2O_5$ is then added in one portion; and heating is continued, with stirring for about 24-60 hours. The reaction product is then precipitated from the PPA reaction solution with water or other nonsolvent.

Specifically, the in-situ polymerization (Scheme 1) of the $A_2B$ monomer, 5-phenoxyisophthalic acid (2), in the presence of dispersed CNF was carried out with varied CNF content (0, 1, 2, 5, 10, 20, 30, & 40 wt %) to yield the carboxylic-acid-terminated (HBP-PEK)-g-VGCNF (3a-h). In a typical preparation, CNF and the $A_2B$ monomer were first mechanically stirred and dispersed into PPA at 130° C. for 4 h. $P_2O_5$ was then added to enhance the acidity and catalytic potency of PPA and to accelerate the polymerization and grafting of $A_2B$ monomer to VGCNF surfaces, which most likely took place concurrently. The homogenous solutions became viscous overnight. The polymerization mixture (dope) remained fluid (but would climb up the stirring rod upon rapid stirring) at the end of each synthesis run. While a linear PEK analog was synthesized in the presence of VGCN, the maximal amount of VGCNF incorporated into nanocomposites was 30 wt %. Higher concentrations led to a bulk viscosity that was too high for efficient mechanical stirring during the final stage of polymerization. 10b However, when analogous hyperbranched PEK was used, even at 40 wt %, (HBP-PEK)-g-VGCNF could be prepared without any stirring difficulty caused by the high bulk viscosity. This improvement is attributed to the non-entangling nature of hyperbranched PEK.

The presence of myriad carboxylic groups at the periphery of the hyperbranched poly(ether-ketone) component provided the possibility in post-polymer functionalization of the materials, and controllable changes in the physical properties resulting from such chain-end modification. Thus, the carboxylic-acid-terminated (HBP-PEK)-g-PEK (3e, 10 wt % of VGCNF) was further functionalized with a benzothiazole (4), a dodecyl ester (5) and an aromatic amine (6), respectively, under appropriate reaction conditions (Scheme 1). Specifically, 3e was condensed with o-aminothiophenol in PPA/$P_2O_5$ at 150° C. to afford the benzothiazole-terminated (HBP-PEK)-g-VGCNF (4). 3e was esterified with 1-dodecanol in presence of N,N'-dicyclohexylcarbodiimide (DCC) as a dehydrating agent and 4-(N,N'-dimethylamino)pyridine (DMAP) as a catalyst to give the dodecylester-teminated (HBP-PEK)-g-VGCNF (5). The amine-terminated analog (6) was obtained via a Schmidt reaction by treating 3e with sodium azide in methanesulfonic acid (MSA) at room temperature. After isolation, (HPB-PEK)-g-VGCNF dissolved more easily in MSA at room temperature than in PPA, methanesulfonic acid was used instead as the solvent for this chemical modification. It is also possible that Schmidt reaction on $CO_2H$-terminated (HBP-PEK)-g-VGCNF can be performed in a one-pot fashion immediately after the polycondensation process in PPA.

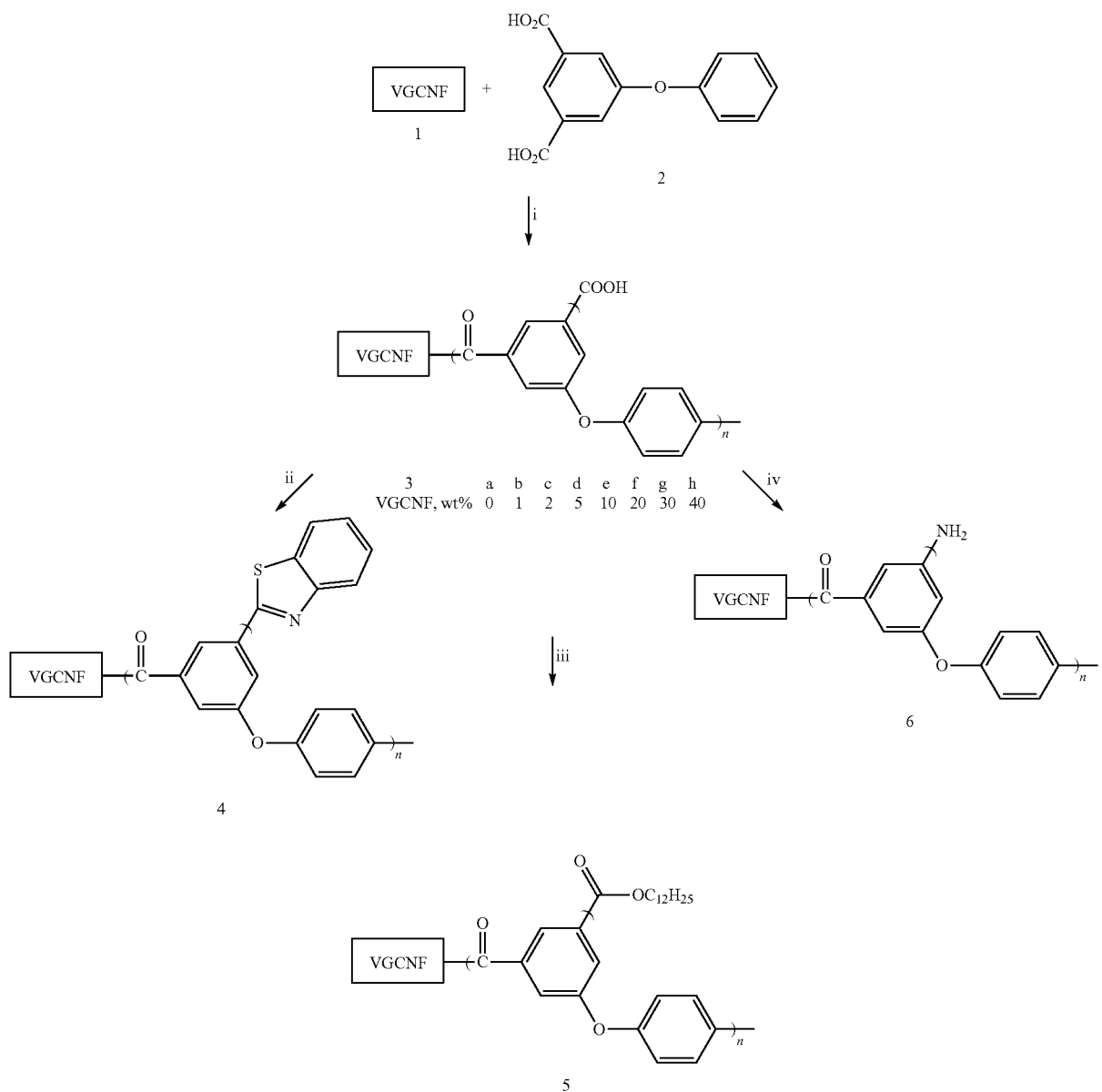

Scheme 1. In-situ polymerization of 5-phenoxyisophthalic acid with VGCNF and its post-polymer functionalization: i. PPA/P$_2$O$_5$, 130° C.; ii. PPA/P$_2$O$_5$, 2-aminothiophenol, 150° C.; iii. 1-dodecanol, DCC, DMAP, DMF; iv. sodium azide, MSA.

The following examples are presented for illustrative purposes only, and are not intended as a restriction on the scope of the invention.

Example 1

1,3-Dimethyl-5-phenoxybenzene

Into a 250 mL three-necked, round-bottomed flask equipped with a magnetic stir-bar, nitrogen inlet and a Dean-Stark trap, phenol (61.0 g, 0.648 mol), toluene (60 mL) and KOH (30.3 g, 0.540 mol) were charged and heated at 145° C. for 3 h with water collected in the Dean-Stark trap. Then, excess phenol and water were removed under reduced pressure at 160° C. for 3 h. Copper (1.0 g), 5-bromo-m-xylene (20.0 g, 0.108 mol) and phenol (30 mL) were added to the dry salt. The mixture was agitated under dry nitrogen at 220° C. for 3 h. The reaction mixture was poured slowly into water (2000 mL) and 5 wt % NaOH solution was added to dissolve excess phenol. The mixture was extracted with ethyl acetate (3×700 mL). The combined extract was dried and evaporated to dryness. The product was further purified by column chromatography (eluent CH$_2$Cl$_2$/hexane 1:7) to afford 19.9 g (93%) of a colorless liquid. Anal. Calcd. for C$_{14}$H$_{14}$O: C, 84.81%; H, 7.12%.

Found: C, 84.59%; H, 7.39%. FT-IR (KBr, cm$^{-1}$): 3039, 2918, 1614, 1585, 1490, 1299, 1220, 1163, 1136, 1027, 950, 850, 756. Mass spectrum (m/e): 198 (M$^+$, 100% relative abundance). $^1$H-NMR (CDCl$_3$, δ in ppm): 2.25 (s, 6H), 6.62 (s, 2H), 6.71 (s, 1H), 6.96 (d, 2H), 7.04 (t, 1H), 7.28 (dd, 2H). $^{13}$C-NMR (CDCl$_3$, δ in ppm): 21.25, 116.60, 118.79, 122.91, 124.95, 129.62, 139.49, 157.12, 157.41.

Example 2

5-Phenoxyisophthalic acid (2)

Into a 1-L three-necked, round-bottomed flask equipped with a magnetic stir-bar, nitrogen inlet and a condenser, 1,3-dimethyl-5-phenoxybenzene (18.0 g, 90.8 mmol), water (140 mL) and pyridine (350 mL) were placed and heated to 100° C. Potassium permanganate (160 g, 1.02 mol) were added in small portions over a 6-hour period. Then the mixture was agitated at 120° C. for 36 h. The manganese dioxide was removed by filtration and washed several time with hot water. The combined filtrate was acidified with dilute HCl solution. The product was collected by filtration and recrystallized from acetic acid to afford 18.0 g (77%) of white crystals, m.p. 301-303° C. (Lit. melting point not reported). Anal. Calcd. for $C_{14}H_{10}O_5$: C, 65.12%; H, 3.90%. Found: C, 64.93%; H, 4.09%. FT-IR (KBr, cm$^{-1}$): 3421, 2826 (Broad, COOH), 2568, 1690(C=O), 1586, 1491, 1320, 1281, 1202, 974, 757. Mass spectrum (m/e): 258 (M$^+$, 100% relative abundance). $^1$H-NMR (CDCl$_3$+DMSO-d$_6$, δ in ppm): 7.05 (d, 2H), 7.17 (t, 1H), 7.39 (dd, 2H), 7.80 (d, 2H), 8.40 (t, 1H), 8.82 (br. s, 2H). $^{13}$C-NMR (CDCl$_3$+DMSO-d$_6$, δ in ppm): 119.22, 123.14, 124.09, 125.38, 129.99, 133.01, 156.05, 157.46, 166.85.

Example 3

Representative Procedure for In-situ Polymerization (20 wt % (HBP-PEK)-g-VGCNF)

Into a 250 mL resin flask equipped with a high torque mechanical stirrer, and nitrogen inlet and outlet, 5-phenoxyisophthalic acid (3.20 g, 12.4 mmol), VGCNF (0.80 g) and PPA (83% $P_2O_5$ assay, 80 g) were charged and stirred with dried nitrogen purging at 130° C. for 4 h. Phosphorus pentoxide ($P_2O_5$, 20 g) was added in one portion. The initially dark mixture became lighter and more viscous as the hyperbranching polymerization process progressed. After 12 h at 130° C., the reaction mixture was so viscous that it would stick to the stirring rod during rapid stirring. The temperature was maintained at 130° C. for 48 h. At the end of the reaction, water was added into the flask. The resulting black polymer clusters were put into a Waring blender and the polymer bundles were chopped, collected by suction filtration, and Soxhlet-extracted with water for three days and methanol (to remove, if any, the residual A$_2$B monomer) for three more days. It was then dried over $P_2O_5$ under reduced pressure at 120° C. for 72 h to afford 3.60 g (95.3% based on theoretical yield of 3.78 g) of black powder.

The calculation of theoretical yield is as follows:

$$\text{Formula Wt. of } C_{14+n}H_8O_4$$

$$\text{theoretical yield (g.)} = 4.0 \text{ g} \times \underline{\qquad}$$

$$\text{Formula Wt. of } C_{14+n}H_{10}O_5$$

4.0 g is total weight of 5-phenoxyisophthalic acid and VGCNF used. $C_{14+n}H_{10}O_5$ is the formula of 5-phenoxyisophthalic acid and VGCNF mixture before the polymerization. $C_{14+n}H_8O_4$ and $C_{14}H_8O_4$ are the empirical formulas of (HBP-PEK)-g-VGCNF and PEK repeat unit, respectively.

Anal. Calcd. for $C_{19.38}H_8O_4$: C, 76.37%; H, 2.63%; O, 21.00%. Found: C, 76.04%; H, 2.79%; O, 19.55%. FT-IR (KBr, cm$^{-1}$): 3425, 3071, 1721 (COOH), 1659 (C=O), 1584, 1501, 1413, 1237, 1163, 760.

Samples 3b, 3c, 3d, 3e, 3 g and 3 h were prepared and worked up following the same procedure as described above with the amounts of starting materials used and product yields listed below. The empirical formula and the result for elemental analysis of each sample can be found in Table 1. Similar set of FT-IR bands in KBr cells as those for 3f were found also for these samples.

1 wt % (HBP-PEK)-g-VGCNF, 3b: 5-phenoxyisophthalic acid (3.96 g, 15.3 mmol), VGCNF (0.04 g), PPA (80 g) and $P_2O_5$ (20 g) were used. Yield: 3.49 g (93.7% based on 3.72 g of theoretical product).

2 wt % (HBP-PEK)-g-VGCNF, 3c: 5-phenoxyisophthalic acid (3.92 g, 15.2 mmol), VGCNF (0.08 g), PPA (80 g) and $P_2O_5$ (20 g) were used. Yield: 3.48 g (93.4% based on 3.73 g of theoretical product).

5 wt % (HBP-PEK)-g-VGCNF, 3d: 5-phenoxyisophthalic acid (3.80 g, 14.7 mmol), VGCNF (0.20 g), PPA (80 g) and $P_2O_5$ (20 g) were used. Yield: 3.56 g (95.6% based on 3.72 g of theoretical product).

10 wt % (HBP-PEK)-g-VGCNF, 3e: 5-phenoxyisophthalic acid (3.60 g, 13.9 mmol), VGCNF (0.40 g), PPA (80 g) and $P_2O_5$ (20 g) were used. Yield: 3.55 g (94.7% based on 3.75 g of theoretical product).

30 wt % (HBP-PEK)-g-VGCNF, 3f: 5-phenoxyisophthalic acid (2.80 g, 10.8 mmol), VGCNF (1.20 g), PPA (80 g) and $P_2O_5$ (20 g) were used. Yield: 3.59 g (94.5% based on 3.80 g of theoretical product).

40 wt % (HBP-PEK)-g-VGCNF, 3 g: 5-phenoxyisophthalic acid (2.40 g, 9.29 mmol), VGCNF (1.60 g), PPA (80 g) and $P_2O_5$ (20 g) were used. Yield: 3.54 g (92.4% based on 3.83 g of theoretical product).

TABLE 1

VGCNF:A$_2$B monomer feed ratio, calculated and TGA-determined
VGCNF:HBP-PEK composition, intrinsic viscosity and elemental analysis data

| | Feed | | Calculated | | Found[a] | | | Elemental Analysis | | |
|---|---|---|---|---|---|---|---|---|---|---|
| Sample | VGCNF (wt %) | HBP-PEK (wt %) | VGCNF (wt %) | HBP-PEK (wt %) | VGCNF (wt %) | [η][b] (dL/g) | | C (%) | H (%) | O (%) |
| 1 | 100 | 0 | 100 | 0 | 99.8 | — | Calcd[c] | 100 | 0 | 0 |
| | | | | | | | Found | 99.02 | 1.01 | <0.1 |
| 3a | 0 | 100 | 0 | 100 | 0.7 | 0.34 | Calcd[c] | 70.00 | 3.36 | 26.63 |
| | | | | | | | Found | 69.54 | 3.47 | 26.23 |
| 3b | 1 | 99 | 1.1 | 98.9 | 1.4 | 0.42 | Calcd[c] | 70.34 | 3.32 | 26.34 |
| | | | | | | | Found | 69.60 | 3.29 | 27.01 |
| 3c | 2 | 98 | 2.2 | 97.8 | 2.6 | 0.47 | Calcd[c] | 70.67 | 3.29 | 26.04 |
| | | | | | | | Found | 70.47 | 3.32 | 26.23 |
| 3d | 5 | 95 | 5.4 | 94.6 | 5.2 | 0.57 | Calcd[c] | 71.62 | 3.15 | 25.22 |
| | | | | | | | Found | 71.48 | 3.10 | 23.93 |

TABLE 1-continued

VGCNF:A$_2$B monomer feed ratio, calculated and TGA-determined
VGCNF:HBP-PEK composition, intrinsic viscosity and elemental analysis data

| | Feed | | Calculated | | Found$^a$ | | | Elemental Analysis | | |
|---|---|---|---|---|---|---|---|---|---|---|
| Sample | VGCNF (wt %) | HBP-PEK (wt %) | VGCNF (wt %) | HBP-PEK (wt %) | VGCNF (wt %) | $[\eta]^b$(d L/g) | | C (%) | H (%) | O (%) |
| 3e | 10 | 90 | 10.7 | 89.3 | 11.0 | 0.82 | Calcd$^c$ | 73.22 | 2.98 | 23.81 |
| | | | | | | | Found | 72.94 | 3.12 | 21.74 |
| 3f | 20 | 80 | 21.2 | 78.8 | 22.1 | 1.46 | Calcd$^c$ | 76.37 | 2.63 | 21.00 |
| | | | | | | | Found | 76.08 | 2.79 | 19.55 |
| 3g | 30 | 70 | 31.5 | 68.5 | 31.3 | 2.45 | Calcd$^c$ | 77.88 | 2.32 | 18.39 |
| | | | | | | | Found | 77.53 | 2.23 | 18.81 |
| 3h | 40 | 60 | 41.8 | 58.2 | 42.1 | 4.89 | Calcd$^c$ | 82.00 | 2.01 | 15.99 |
| | | | | | | | Found | 81.82 | 2.10 | 16.47 |
| 4 | 7.1 | 92.9 | 7.9 | 92.1 | 8.2 | 0.64 | Calcd$^c$ | 71.92 | 2.94 | 12.84 |
| | | | | | | | Found | 72.44 | 3.18 | 12.53 |
| 5 | 6.4 | 93.6 | 6.9 | 93.1 | 6.9 | 0.56 | Calcd$^c$ | 78.03 | 7.32 | 14.65 |
| | | | | | | | Found | 78.54 | 7.61 | 13.93 |
| 6 | 11.1 | 88.9 | 11.8 | 88.2 | 10.3 | 0.67 | Calcd$^c$ | 77.07 | 3.75 | 13.34 |
| | | | | | | | Found | 76.81 | 3.88 | 12.97 |
| 7 | — | — | 10.7 | 89.3 | 10.2 | — | Calcd$^c$ | 73.22 | 2.98 | 23.81 |
| | | | | | | | Found | 72.45 | 3.22 | 25.75 |

$^a$Residual weight percentage at 650 °C. from TGA thermograms in air.
$^b$Intrinsic viscosity measured in NMP at 30.0 ± 0.1 °C.
$^c$A$_2$B repeat unit C$_{14}$H$_8$O$_4$ and calculated repeat unit as followed:
3a (100:0) C$_{14}$H$_8$O$_4$;
3b (1:99) C$_{14.23}$H$_8$O$_4$;
3c (2:98) C$_{14.45}$H$_8$O$_4$;
3d (5:95) C$_{15.13}$H$_8$O$_4$;
3e (10:90) C$_{16.39}$H$_8$O$_4$;
3f (20:80) C$_{19.38}$H$_8$O$_4$;
4g (30:70) C$_{22.59}$H$_8$O$_4$;
3f (40:60) C$_{27.33}$H$_8$O$_4$;
5 C$_{22.39}$H$_{11}$NO$_3$S;
6 C$_{28.39}$H$_{32}$O$_4$;
7 C$_{15.39}$H$_9$NO$_2$.
The formula of (HBP-PEK)-g-VGCNF is C$_{14 + n}$H$_8$O$_4$.
C$_{14}$H$_8$O$_4$ is the formula of PEK repeat unit.
Subscript n is the number of VGCNF carbons per PEK repeat unit and calculated as followed:

$$n = \frac{\text{(Weight percentage of VGCNF)}/\text{(Weight percentage of HBP-PEK)}}{240.22}$$

Where 12.011 is VGCNF formula (C) molecular weight and 240.22 is the molecular weight of HBP-PEK repeat unit

Example 4

Benzothiazole-Terminated HBP-PEK)-g-VGCNF

Into a 250 mL resin flask equipped with a high torque mechanical stirrer, and nitrogen inlet and outlet, (HBP-PEK)-g-VGCNF, Example 3e (4.0 g, 10.1 mmol), 2-aminothiophenol (3.5 g, 28.0 mmol), phosphorus pentoxide (P$_2$O$_5$, 20 g) and PPA (83% P$_2$O$_5$ assay, 80 g) were charged and stirred with dry nitrogen purging at 150° C. for 24 h. At the end of the reaction water was added into the flask. The resulting black polymeric clusters were put into a Waring blender and the polymer bundles were chopped, collected by suction filtration, and Soxhlet extracted with water for three days and methanol for three days. It was then dried over P$_2$O$_5$ under reduced pressure at 120° C. for 72 h to give the product in quantitative yield. Anal. Calcd. for C$_{22.39}$H$_{11}$NO$_3$S: C, 71.92%; H, 2.94%; N, 3.74%; O, 12.84%. Found: C, 72.44%; H, 3.55%; N, 3.98%; O, 12.53%. FT-IR (KBr, cm$^{-1}$): 3452, 3057, 1660 (C=O), 1604, 1581, 1500, 1311, 1222, 1166, 757.

Example 5

Dodecyl-Terminated (HBP-PEK)-g-VGCNF

Into a 100 mL three necked flask equipped with a mechanical stirrer, and nitrogen. inlet and outlet, (HBP-PEK)-g-VGCNF, Example 3e (2.0 g, 5.04 mmol), 1-dodecanol (4.0 g, 21.4 mmol), N,N'-dicyclohexylcarbodiimide (DCC, 2.10 g, 10.2 mmol), 4-(N'N-dimethylamino)pyridine (DMAP, 0.2 g) and N,N-dimethylformamide (200 mL) were charged and stirred with dried nitrogen purging at room temperature for 3 d. At the end of the reaction it was poured into water. The resulting black polymeric material collected by suction filtration and Soxhlet-extracted with methanol for more three days. It was then dried over P$_2$O$_5$ under reduced pressure at 120° C. for 72 h to give the product in quantitative yield. Anal. Calcd. for C$_{28.39}$H$_{32}$O$_4$: C, 78.67%; H, 7.32%; O, 13.93%. Found: C, 79.66%; H, 7.76%; O, 14.65%. FT-IR (KBr, cm$^{-1}$): 2925, 2854, 1723 (ester), 1660 (C=O), 1582, 1232, 1163, 1002, 991.

Example 6

Amine-Terminated (HBP-PEK)-g-VGCNF

Into a 100 mL three necked flask equipped with a mechanical stirrer, and nitrogen inlet and outlet, (HBP-PEK)-g-VGCNF, Example 3e (1.0 g, 2.52 mmol) and methanesulfonic acid (MSA, 16.7 g) were charged and stirred with dry nitrogen purging at room temperature. Sodium azide (0.19 g, 2.52 mmol) was added in several portions over 4 h. The mixture was stirred at room temperature for 3 days, and then was poured into methanol. The resulting black polymeric material collected by suction filtration and Soxhlet-extracted with water for three days and methanol for three more days. It was then dried over $P_2O_5$ under reduced pressure at 120° C. for 72 h to give the product in quantitative yield. Anal. Calcd. for $C_{15.39}H_9NO_2$: C, 77.07%; H, 3.75%; O, 13.34%.

Found: C, 77.82%; H, 3.86%; O, 12.97%. FT-IR (KBr, cm$^{-1}$): 3441, 3384 (NH$_2$), 3027, 1647 (C=O), 1581, 1384, 1239, 1165.

Example 7

Thermal properties of (HBP-PEK)-g-VGCNF materials

| | Calculated Composition[a] | | | TGA | | | |
|---|---|---|---|---|---|---|---|
| | | | | in nitrogen | | in air | |
| | | | | | Char at 650° | | Char at 650° |
| Sample | VGCNF (wt %) | HBP-PEK (wt %) | DSC $T_g^b$ (° C.) | $T_{5\%}^c$ (° C.) | C. (wt %) | $T_{5\%}^c$ (° C.) | C. (wt %) |
| 1 | 100 | 0 | — | >900 | 99.7 | 723 | 99.8 |
| 3a | 0 | 100 | 227 | 408 | 55.5 | 387 | 0.7 |
| 3b | 1.1 | 98.9 | 231 | 417 | 56.2 | 383 | 1.4 |
| 3c | 2.2 | 97.8 | 231 | 417 | 57.7 | 400 | 2.6 |
| 3d | 5.4 | 94.8 | 232 | 386 | 65.3 | 379 | 5.2 |
| 3e | 10.7 | 89.3 | 235 | 420 | 61.2 | 410 | 11.0 |
| 3f | 21.2 | 77.9 | 241 | 426 | 66.8 | 419 | 22.1 |
| 3g | 31.5 | 68.5 | 244 | 414 | 71.2 | 413 | 31.2 |
| 3h | 41.8 | 58.2 | 248 | 405 | 75.5 | 412 | 42.1 |
| 4 | 7.9 | 92.1 | 184 | 429 | 63.0 | 432 | 8.2 |
| 5 | 6.9 | 93.1 | 81 | 377 | 54.8 | 356 | 6.9 |
| 6 | 11.8 | 88.2 | 242 | 398 | 65.8 | 394 | 10.6 |
| 7 | 10.7 | 89.3 | 227 | 414 | 60.4 | 402 | 10.2 |

[a]Calculation based on the assumption that VGCNF is 100% C and the molar mass of the repeat unit of HBP-PEK is 240.22.
[b]Inflection in baseline on DSC thermogram obtained in N$_2$ with a heating rate of 10° C./min.
[c]Temperature at which 5% weight loss occurred on TGA thermogram obtained with a heating rate of 10° C./min.

Example 8

The following is a representative procedure polymerization of 5-phenoxyisophthalic acid in the presence of various amounts of MWNT:

(HBP-PEK with 20 wt % MWNT). Into a 250 mL resin flask equipped with a high torque mechanical stirrer, and nitrogen inlet and outlet, 5-phenoxyisophthalic acid (1.60 g, 6.20 mmol), MWNT (0.40 g) and PPA (83% $P_2O_5$ assay, 40 g) were charged and stirred with dried nitrogen purging at 130° C. for 4 h. Phosphorus pentoxide ($P_2O_5$, 10 g) was added in one portion. The initially dark mixture became lighter and more viscous as the grafting of MWNT and self-polymerization of A$_2$B monomer progressed. After 24 h at 130° C., the'reaction mixture was so viscous that it started to stick to the stirring rod. The temperature was maintained at 130° C. for 48 h. At the end of the reaction water was added into the flask. The resulting black MWNT/polymer clusters were put into a Waring blender and the polymer bundles were chopped, collected by suction filtration, and Soxhlet-extracted with water for three days and methanol for three more days. It was then dried over $P_2O_5$ under reduced pressure at 120° C. for 72 h to give the product in quantitative yield. Anal. Calcd. For $C_{19.38}H_8O_4$: C, 77.37%; H, 2.63%; O %, 21.00. Found: C, 74.43%; H, 2.42%; O %, 20.60. FT-IR (KBr, cm$^{-1}$): 3425, 3071, 1720 (COOH), 1659 (C=O), 1583, 1501, 1413, 1237, 1163.

Example b 9

Thermal properties of (HBP-PEK)-g-MWNT

| | Calculated Composition[a] | | | TGA | | | |
|---|---|---|---|---|---|---|---|
| | | | | in nitrogen | | in air | |
| | | | | | Char at 650° | | Char at 800° |
| No. | MWNT (wt %) | HBP-PEK (wt %) | DSC $T_g^b$ (° C.) | $T_{5\%}^c$ (° C.) | C. (wt %) | $T_{5\%}^c$ (° C.) | C. (wt %) |
| 1 | 100 | 0 | — | 851 | 96.5 | 574 | 3.42 |
| 8a | 0 | 100 | 227 | 387 | 46.9 | 408 | 0.7 |
| 8b | 2.2 | 97.8 | 230 | 433 | 55.2 | 434 | 0.27 |
| 8c | 5.4 | 94.8 | 233 | 421 | 55.0 | 425 | 0.28 |
| 8d | 10.7 | 89.3 | 236 | 425 | 57.9 | 418 | 0.44 |
| 8e | 21.2 | 77.9 | 242 | 431 | 64.0 | 425 | 0.73 |
| 8f | 31.5 | 68.5 | 246 | 428 | 68.4 | 428 | 0.88 |

[a]Calculation based on the assumption that CNF is 100% C and the molar mass of the repeat unit of HBP-PEK is 240.22.
[b]Inflection in baseline on DSC thermogram obtained in N$_2$ with a heating rate of 10° C./min.
[c]Temperature at which 5% weight loss occurred on TGA thermogram obtained with a heating rate of 10° C./min.

Having thus described exemplary embodiments of the present invention, it should be noted by those skilled in the art that the disclosures herein are exemplary only and that alternatives, adaptations and modifications may be made within the scope of the present invention.

We claim:
1. A hyperbranched poly(ether-ketone) composite of the formula:

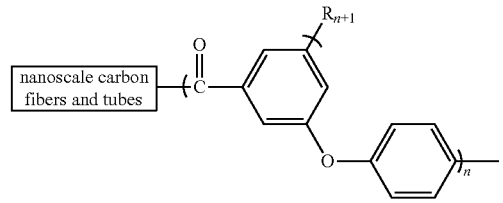

wherein n is the degree of polymerization and R is a carboxylic acid or a functional group derived from a carboxylic acid.

2. The hyperbranched poly(ether-ketone) composite of claim 1 wherein R is selected from the group consisting of carboxylic acids, benzazoles, esters, and amines derived from carboxlic acids.

3. The hyperbranched poly(ether-ketone) composite of claim 2 wherein R is a carboxylic acid.

4. The hyperbranched poly(ether-ketone) composite of claim 2 wherein R is a benzazole having the formula:

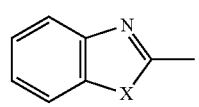

wherein X=O, S, NH, N-alkyl or NPh.

5. The hyperbranched poly(ether-ketone) composite of claim 4 wherein X=S.

6. The hyperbranched poly(ether-ketone) composite of claim 4 wherein X=O.

7. The hyperbranched poly(ether-ketone) composite of claim 4 wherein X=NH, N-alkyl or NPh.

8. The hyperbranched poly(ether-ketone) composite of claim 2 wherein R is an alkylester with the formula: —C(=O)—OR', wherein R' is —(CH$_2$)$_m$—CH$_3$, and m=1-20.

9. A process for preparing the hyperbranched poly(ether-ketone) composite of claim 1, which comprises the steps of:
  (a) combining an aromatic diacid (A$_2$ B monomer) of the formula:

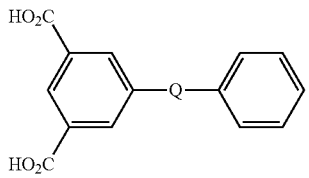

wherein Q is —O— or —O—(CH$_2$)$_n$—O—, n has a value of from 2-12, nanoscale carbon fibers or tubes, and PPA with about 83% P$_2$O$_5$ content;
  (b) stirring this mixture at about 130° C. for about 4 hours;
  (c) adding additional P$_2$O$_5$;
  (d) continuing to heat the mixture with stirring for about 24-60 hours; and
  (e) recovering the reaction product.

10. A process for preparing a benzazole-terminated hyperbranched poly(ether-ketone) composite which comprises the steps of:
  (a) combining the carboxylic acid terminated hyperbranched poly(ether-ketone) composite of claim 3,

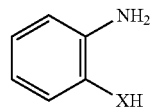

wherein X=O, S, NH, N-alkyl or NPh, and PPA with about 83% P$_2$O$_5$ content;
  (b) stirring this mixture at about 130° C. for about 4 hours;
  (c) adding additional P$_2$O$_5$;
  (d) continuing to heat the mixture at 150° C. With stirring for about 24 hours; and
  (e) recovering the reaction product.

11. A process for preparing an amine-terminated hyperbranched poly(ether-ketone) composite which comprises the steps of:
  (a) combining the carboxylic acid terminated hyperbranched poly(ether-ketone) composite of claim 3 and methanesulfonic acid;
  (b) stirring this mixture at room temperature and adding lithium azide in portions over a period of about 4 hours;
  (c) continuing to stir this mixture for about 3 days; and
  (d) recovering the reaction product.

12. A process for preparing an alkylester-terminated hyperbranched poly(ether-ketone) composite which comprises the steps of:
  (a) combining the carboxylic acid-terminated hyperbranched poly(ether-ketone) composite of claim 3, an alcohol, a carbodiimide-based coupling reagent, 4-(N,N-dimethylamino)pyridine and an amide solvent;
  (b) stirring this mixture at room temperature for about 4 days; and
  (c) recovering the reaction product.

* * * * *